United States Patent Office 3,436,440
Patented Apr. 1, 1969

3,436,440
METHOD OF GRAFT-COPOLYMERIZATION OF MONOMERS ONTO DIENE-TYPE POLYMER
Shokichi Abe, Koichi Kakefuda, and Mitsuo Honjo, Hitachi-shi, Japan, assignors to Hitachi Chemical Company, Ltd., Tokyo, Japan
No Drawing. Filed May 13, 1965, Ser. No. 455,588
Claims priority, application Japan, May 14, 1964, 39/26,966
Int. Cl. C08f 15/40, 1/11
U.S. Cl. 260—880                                            9 Claims

ABSTRACT OF THE DISCLOSURE

The present disclosure is directed to an improved method for graft-copolymerizing a vinyl monomer onto a polymer in the form of a latex which comprises effecting the polymerization in the presence of a polymerization initiator soluble in the vinyl monomer and a suspending agent in an amount at least sufficient to convert the reaction product from the emulsion state to the suspension state.

---

This invention relates to a method for graft-copolymerization of monomeric vinyl compound on a polymer prepared in latex form. More particularly this invention relates to a method for producing a ternary graft-copolymer consisting essentially of polybutadiene or styrene-butadiene type synthetic rubber, styrene and acrylonitrile.

It is a prevailing method that a latex such as polyvinyl chloride, polyacrylate, ethylene - vinylacetate-polymer, polybutadiene, and styrene-butadiene copolymer and a monomeric vinyl compound (vinyl monomer) are subjected to graft-copolymerization with the use of a suitable polymerization initiator. The polymerization initiator used in this reaction is, in general, a water-soluble type of polymerization initiator such as potassium persulfate.

However in such graft-copolymerization method, an excessive amount of soap incorporated therein to stabilize latex increases the molecular weight of ungrafted vinyl polymer to such an extent as grafting percentage is reduced. This fact can be understood easily from the Smith-Ewart theory. An attempt to disperse or emulsify a vinyl monomer in a polymer latex and to effect polymerization with a polymerization initiator soluble in the vinyl monomer may be thought of.

However in this case, the latex i.e., emulsion phase is destroyed with the progress of polymerization reaction and polymers which have not yet completed the polymerization reaction, precipitate, become sticky and show agglomeration phenomenon. In the case of emulsion polymerization, polymers produced by salting-out are muddy slurries and the filtration and the drying of these materials requires extremely long period of time and expensive apparatus.

The first object of the present invention is to provide an improved method for graft-copolymerization which does not accompany the agglomeration.

The second object of the present invention is to provide a method for graft-copolymerization which does not need salting out step and render the filtration and the drying of polymers very easy.

Ternary graft-copolymers consisting essentially of polybutadiene or styrene-butadiene synthetic rubber, styrene and acrylonitrile have been widely known in the name of ABS resins.

Since these resin compositions possess high impact resistance and good moldability, they have been widely used as raw materials for moulding. However these resins are not always satisfactory in the properties necessary for moulding purpose e.g., flow characteristics of resin at the time of molding and lustre of the surface of molded product in spite of its advantage of high impact resistance. The methods for the manufacture of ABS resins are classified roughly, in general, into graft-copolymerization-, blending- and composite-method. The resin compositions produced by these methods, even when produced by the graft-copolymerization method, contain always, beside ternary graft-copolymer between rubbery polymer, styrene and acrylonitrile, considerable amounts of binary copolymer between acrylonitrile and styrene and also of rubbery polymer itself when viewed from the point of composition. It is evident that the various characteristic properties of resin compositions have intimate relationship with the molecular weight distribution and the contents of constituting polymers. Accordingly in the production method aiming the improvement or the elevation of such characteristic properties, the proportion of each constituents in the resin compositions, particularly the amount and the molecular weight distribution of graft-copolymer produced (grafter amount) have come to the front.

Thus an attempt to increase the grafted amount by increasing an average particle diameter of latex of rubbery polymers used so as to improve the processability and another attempt to control the molecular weight distribution by blending a graft-copolymer and an acrylonitrile-styrene-copolymer, etc. have been proposed. In the latter, different nongrafted copolymers are independently synthetized by suspension-polymerization- and emulsion-polymerization-methods, and definite amounts of these polymers are blended to a rubbery substrate of ternary graft-copolymer by which the control of the proportions of graft-copolymer and of nongrafted copolymer and further the control of molecular weight distributions between each nongrafted copolymers have been effected.

The third object of the present invention is to provide a method for controlling the contents and the molecular weight distributions of each constituent polymers in the resin compositions with only one polymerization step economically and efficiently without the repetition of troublesome complicated steps of polymer-blend.

The fourth object of the present invention is to provide a method for the improvement on the flow characteristics of the resin compositions without reducing their impact resistance. The fifth object of the present invention is to provide a method which affords molded products having improved surface lustre. The sixth object of the present invention is to provide a method which affords resin compositions having balanced characteristics. Other and further objects and advantages of the invention will become apparent to those skilled in the art upon consideration of the accompanying disclosure.

In accordance with the present invention there is provided a method for graft-copolymerization which comprises mixing a polymer in the form of latex with a vinyl monomer in the presence of polymerization initiator soluble in the vinyl monomer and of suspending agent to effect the reaction. The present invention consists in the method which is characterized in the combination of the control of polymer in the form of latex, and the use of oil-soluble polymerization initiator (soluble in vinyl monomer) and of suspending agent.

When the above-described polymerization method is used, the polymerization reaction proceeds in the type of emulsion polymerization in the beginning and after a certain percentage of polymerization is reacted, the break down of emulsion is brought about. In order to prevent the agglomeration of the resin formed, a suspending agent such as polyvinyl alcohol is used in advance. In other words in the polymerization reaction of the present invention, the polymerization proceeds in the emulsified state in the beginning and after a certain point the polymerization proceeds in the suspended state. The polymerization in the emulsified state can be deemed to be initiated at following three kinds of part; (A) micellar particles containing monomers, (B) rubbery polymer particles and (C) oily drop of monomers. At the part A, the copolymerization of monomers alone is initiated by a water-soluble polymerization initiator. In this instance, copolymers having relatively high molecular weight are formed since the polymerization proceeds in accordance with mechanism of emulsion polymerization. Of course by an oil-soluble polymerization initiator contained in monomers, the polymerization at the part A occurs, but since the initiator radicals produced in this instance always make a pair, they soon initiate terminating reaction in micelles and can hardly produce high molecular weight copolymers. At the part B, the graft-copolymerization of monomers upon rubbery polymers occurs. In this instance monomers are supplied successively from surrounding oily monomer drops C, the formation of grafted branch proceeds and ternary graft copolymers are obtained. A majority of monomers in the oil drops C migrate to the parts A and B with the advancement of polymerization at corresponding parts but because of the existence of oil-soluble polymerization initiator, the polymerization proceeds also at the parts C with mechanism different from A and C. Consequently considerable amounts of binary copolymers are formed also at the parts C. The molecular weight of such binary copolymers will be considerably lower than that of the parts A.

After fully investigating, the inventors of the present invention have discovered that the simultaneous use of each more than one kind of oil-soluble polymerization initiator and water soluble polymerization initiator creates such an unique effect as hardly attainable with an oil-soluble polymerization initiator alone. In other words since both kinds of polymerization initiators, oil soluble and water soluble, coexist in the emulsion state a composition consisting of a mixture of three kinds, i.e., a ternary graft-copolymer and a high molecular weight binary copolymer produced by the water soluble polymerization initiator and a relatively low molecular weight binary copolymer produced by the oil soluble polymerization initiator and having a fairly wide range of constitution and molecular weight distribution is obtained.

With the progress of polymerization in the emulsion system, numbers of particles of each polymers are increased, and with only the emulsifier of the rubbery polymer included in this system of emulsified state, a homogeneous emulsified state cannot be maintained, causing break down of emulsion. However even when the break down of emulsion occurs, suspending agent added in advance prevents the agglomeration and turns the system into a stabilized suspension state. If necessary, it is possible to add water or diluted aqueous polyvinyl alcohol solution separately prepared.

Thus in accordance with the present invention a graft-copolymerization method which uses such an amount of suspending agent as is sufficient to make the reaction shift from the emulsion system to the suspension system is provided. In another aspect a novel graft-copolymerization method which is carried out with simultaneous use of each more than one kind of oil-soluble i.e., vinyl monomer soluble polymerization initiator and water-soluble initiator and in the presence of suspension agent is provided.

Suspended particles in the suspension system contain uniformly unreacted monomer, rubbery polymer and oil-soluble polymerization initiator necessary for completing the polymerization of these, together with particles of each polymers previously formed in the emulsion system. Consequently the polymerization after the break down of emulsion, is advanced solely by this oil-soluble polymerization initiator, the graft-copolymerization of monomer onto the rubbery polymer and the nongraft-copolymerization between each monomers proceed simultaneously by the suspension polymerization mechanism and a ternary graft-polymer and a binary copolymer which possess fairly different compositions and molecular weights are obtained. The shift from the emulsion system to the suspension system is considered to occur when the percentage of polymerization of the system reached about 60 percent. However the time of shift to the emulsion system can be controlled optionally by increasing or decreasing the amount of suspending agent to be added in advance or the amount of emulsifying agent or by adding 0.1 to 1.0 percent polyvinyl alcohol solution or the like at an appropriate time from the outside. This control is particularly preferable to be carried out in the range of polymerization percentage of 45 to 65 percent. By controlling the time of the phase shift it is also possible to control the proportions of each polymers produced in the above-described emulsion system and each polymers produced in the suspension system. The resin compositions produced according to the present invention are considered to be a mixture having very wide variation both in the compositions produced by the emulsion polymerization and the suspension polymerization and in the distributions of molecular weights. Besides this by the proper choice of the above-mentioned state shift time and hence by the control of the proportion of each constituents, the variation of the present resin compositions can be still more increased. In other words the wideness of compositions of ternary graft-copolymer and nongraft-copolymer and of their molecular weight distribution in the present resin compositions can be very much broader. Furthermore by controlling the molecular weight distribution properly it is possible to improve the flow characteristics without deleteriously affecting various properties, particularly the impact resistance of the present compositions and further possible to control the balance of each characteristic.

Still more in the present invention, it is a notable advantage that the object can be attained sufficiently by only one step polymerization. There is no need of such complicated steps as the preparation of individual polymers of different compositions and as the operation carried out in several steps for the purpose of mixing polymers thus produced and the like as is the case in the polymer blend method.

Since the polymerization course is carried out ultimately in the type of suspension polymerization, in the present invention, resulting resins are obtained in the forms of fine particles and powders easily filterable. The salting out step which is common in the case of usual emulsion polymerization is not necessary. Furthermore the easiness of the operation of filtration and washing makes the present method very economical.

Polymer latices used in the present invention include latices of polyvinyl chloride, polyacrylates, ethylene-vinyl acetate copolymer and rubbery polymers of diene type.

Representative latices of rubbery polymers of diene type, include, for example, polybutadiene latex, butadiene-styrene-copolymer latex and the like. Among butadiene-styrene-copolymers those containing more than 60 percent butadiene are preferable.

Vinyl monomers to be grafted, include acrylonitrile, methacrylonitrile, vinyl chloride, acrylic esters, methacrylic esters, aromatic vinyl monomers represented by styrene, α-methyl styrene, vinyl toluene, α-methyl vinyl toluene, dimethyl styrene, chlorostyrene, vinyl naphthalene and the like. These can be represented by the general formula:

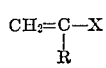

wherein R is H or $CH_3$ and X is Cl, CN or a carboxyl-ester radical.

Oil-soluble polymerization initiators used in the present invention include organic peroxides, such as octanoyl peroxide, lauroyl peroxide, cyclohexanone peroxide, tertiary-butyl perisobutyrate, benzoyl peroxide, and azo compounds such as 2,2′-azobis-propionitrile.

Water-soluble polymerization initiator simultaneously used with the above-described oil-soluble polymerization initiator are those used in the common emulsion polymerization. Illustrative of such initiators are potassium persulfate, ammonium persulfate, hydrogen peroxide, and redox type catalysts such as cumene hydroperoxide-ferrous sulfate.

Typical suspending agents include inorganic suspending agents such as calcium carbonate, barium carbonate, talc and bentonite and organic suspending agents such as polyvinyl alcohol, hydroxyethyl cellulose, gelatin, polyvinyl ether, carboxymethyl cellulose and polyacrylic salt. In actual operation it is perferable to use an organic suspending agent alone or a combination of organic suspending agent with an inorganic suspending agent in order to obtain a good suspension state. In order to effect the shift from the emulsion system to suspension system from at the boarder line of emulsion breakdown a suitable suspending agent is added either before the starting of polymerization or at the time of emulsion break down. When polyvinyl alcohol is used as a suspending agent, it is preferable that the polymerization degree is in the range of 1,000 to 2,000 and the saponification degree is in the range of 80 to 90 percent.

It is possible to add a mercaptane such as tertiary dodecyl mercaptane and normal dodecyl mercaptane as a chain transfer agent in order to control the polymerization degree.

It is effective to add a small amount of emulsifier such as fatty acid soap, rosine acid soap, alkyl sulfonic acid soap and aromatic sulfonic acid soap to aid the emulsification beside the emulsifier contained in the polybutadiene latex.

It is also possible to add an antioxidant so as to prevent coloration and contamination of resin before or during the polymerization.

The conditions of use for suspending agents, emulsifiers and antioxidant are not limited by the disclosure in examples hereinafter described.

Various kinds of homogenizers can be used to emulsify reaction solution homogeneously.

The polymerization temperature should be selected depending upon the kind of polymerization initiator but in general it is in the range of 70° to 80° C. preferably 30° to 100° C.

As to the suitable mixing amounts of raw materials in the preparation of diene-type thermoplastic polymer such as acrylonitrile-butadiene-styrene used in the present invention, following explanation will now be given.

Ranges of diene and aromatic vinyl monomer and other polymerizable monomer in the diene type rubbery polymer are preferable to be 5 to 30 parts by weight 50 to 85 parts by weight, and 10 to 30 parts by weight, respectively. When styrene is used as an aromatic vinyl monomer in an amount less than 50 parts by weight, the flowing out speed of resulting polymer at a molding temperature is low and mouldability is poor. On the other hand when the aromatic vinyl monomer is used in an amount more than 85 parts by weight, the impact strength of resulting polymer is exceedingly reduced. When the amount of other polymerizable monomer e.g., acrylonitrile used is less than 10 parts by weight, the heat resistance and the impact resistance become poor and when it is more than 30 parts by weight, the flow characteristics is reduced and is liable to be discolored and contaminated by heating.

The following examples are given to illustrate the present invention without limiting its scope. Parts by weight are used throughout.

EXAMPLE 1

| | Parts |
|---|---|
| Water | 200 |
| SB Latex (supplied by Nippon Geon: trade name Nipol 4850) | 44 |
| Acrylonitrile (hereinafter referred to AN) | 31 |
| Styrene (hereinafter referred to ST) | 99 |
| Polyvinyl alcohol (hereinafter referred to PVA) | 0.4 |
| Tertiary dodecyl mercaptane (hereinafter referred to t-$D_o$SH) | 0.4 |
| Benzoyl peroxide | 2.3 |

EXAMPLE 2

| | Parts |
|---|---|
| Water | 200 |
| SB Latex (the same material as in Example 1) | 44 |
| AN | 31 |
| ST | 99 |
| PVA | 0.4 |
| t-$D_o$SH | 0.4 |
| Lauroyl peroxide (LPO) | 2.3 |

EXAMPLE 3

| | Parts |
|---|---|
| Water | 200 |
| SB Latex (the same material as in Example 1) | 44 |
| AN | 31 |
| ST | 99 |
| PVA | 0.4 |
| t-$D_o$SH | 0.4 |
| α,α′-Azo-bis-isobutyrolnitrile | 2.3 |

In each example the above-described constituents in a reactor were heated under atmosphere of nitrogen at a temperature of 75° C. while stirring to effect graft-copolymerization. At one hour after the commencement of polymerization, the emulsion state was broken down, the cohesion of particles occurred and the mobility of reaction solution became poor. By adding 150 parts water, cohered particles were dispersed again and the free flowing state was retrieved. After maintained at a temperature of 75° C. for 2 hours, the whole system was cooled. Polymerization products were of 0.5 to 1 mm. powder and passed filter cloths easily without causing clogging at meshes. The polymers were dried after repetition of washing with water and filtering 4 times.

Characteristic properties of the resulting polymers are shown in Table 1.

TABLE 1

| Examples | Item of testing | |
|---|---|---|
| | Flowing out speed (cm.³/sec.) | Impact resistance (15° C.) (kg.-cm./cm.) |
| 1 | 107×10⁻⁴ | 42.2 |
| 2 | 225×10⁻⁴ | 40.4 |
| 3 | 65.9×10⁻⁴ | 35.7 |

The following out speed was measured with a Ko-KA type flow tester: diameter of nozzle, 1 mm.; temperature, 200° C.; load, 30 kg./cm.²; supplier, Shimazu Seisakusho; and the impact resistance was measured in accordance with JIS–K6871.

EXAMPLE 4

Three kinds of solutions having following compositions were prepared in advance.

Solution A

| | Parts |
|---|---|
| Water | 200 |
| PVA (polymerization degree, 1,700; saponification degree, 80%) | 0.7 |
| Potassium persulfate (hereinafter referred to KPS) | 0.05 |

Solution B

| | Parts |
|---|---|
| Polybutadiene latex (hereinafter referred to PBα) (as expressed by solid polybutadiene) | 27.0 |

Solution C

| | Parts |
|---|---|
| ST | 99.0 |
| AN | 31.0 |
| LPO | 0.3 |
| t-D$_0$SH | 0.5 |

The above-described Solution A was introduced in a beaker, and while stirring, the Solution B and the Solution C were gradually added thereto and the stirring was continued for further 10 minutes. The mixture was transferred to a glass reactor and while stirring, maintained at a temperature of 75° C. by heating. After elapse of 1.5 to 2.0 hours from the time when the temperature has reached 75° C., since the viscosity increased so much as unable to continue stirring 200 parts of 0.2 percent PVA aqueous solution were added. As the result the emulsion state was broken and resin constituents and unreacted monomer moved into the suspension state, forming particlets of 0.1 to 0.3 mm. size. The polymerization was carried out at the same temperature and completed in 3 hours. The resulting polymer, filtered, washed with water and dried, was charged into an extruder to produce molding pellets. The yield was 95 percent. The mechanical properties were tested with specimens prepared by an injection molding machine and compared with those produced using KPS and LPO alone. The amounts of initiators were also changed. The result of these cases are shown in Table 2.

TABLE 2

| Amounts of initiators (parts) | Impact resistance (kg.-cm./cm.) | Tensile strength (kg./cm.$^2$) | Elongation (percent) | Flowing out velocity (cm.$^3$/sec.) |
|---|---|---|---|---|
| KPS 0.05, LPO 0.30 | 35.7 | 380 | 57.5 | 7.5×10$^{-3}$ |
| KPS 0.25, LPO 1.20 | 30.4 | 330 | 48.7 | 6.7×10$^{-3}$ |
| LPO 2.4 | 30.0 | 300 | 77.3 | 3.1×10$^{-3}$ |
| KPS $^1$ 0.5 | 15.0 | 328 | 42.1 | 2.1×10$^{-3}$ |

$^1$ A common emulsion polymerization method was used.

The impact resistances were values expressed by the impact strength of V-notched Izod. The tensile strengths and elongations were values measured with a Tensilon universal tension tester. The flowing out velocity were values measured with a Ko-KA type flow tester under a load of 20 kg., at a temperature of 200° C. and having a nozzle of 1φ x 2 mm.

As evident from this table the simultaneous use of KPS and LPO improves mechanical properties and elevates flowing out velocities.

EXAMPLE 5

Three kinds of solution having following compositions were prepared in advance.

Solution A

The same with the Solution A in Example 4.

Solution B

| | Parts |
|---|---|
| PBα latex (as expressed by solid matter) | 18.0 |

Solution C

| | Parts |
|---|---|
| ST | 99.0 |
| LPO | 45.0 |
| t-D$_0$SH | 0.3 |
| AN | 40.0 |

The polymerization was carried out by the same method as in Example 4 except that the compositions of monomer and PBd were changed. After 2.5 hours of polymerization, the emulsion was broken down and 0.2 percent PVA aqueous solution was added. After-treatment was also carried out according to that in Example 4. The yield was 91 percent. Following characteristic properties were obtained: impact resistance, 30.5 kg.-cm./cm.; tensile strength, 39.5 kg./cm.$^2$; elongation, 28 percent, and flowing out velocity, 8.5×10$^{-3}$ cm.$^3$/sec.

EXAMPLE 6

Three kinds of solution having following compositions were prepared in advance.

Solution A

| | Parts |
|---|---|
| Water | 200 |
| PVA (the same material as in Example 4) | 1.4 |
| KPS | 0.05 |

Solution B

| | Parts |
|---|---|
| SBR latex (percentage of butadiene in solid SBR was 75 percent) | 23 |

Solution C

| | Parts |
|---|---|
| ST | 99 |
| LPO | 0.3 |
| α-Methyl styrene | 5 |
| AN | 31 |
| t-D$_0$SH | 0.5 |

The polymerization was carried out by the same method as in Example 4 except that SBR was used as latex and α-methyl styrene was used together with ST as aromatic vinyl monomer. The yield was 93 percent and characteristic properties obtained were as follows: impact resistance, 22.3 kg.-cm./cm.; tensile strength, 410 kg./cm.$^2$; elongation, 49.8 percent; flowing out velocity, 5.2×10$^{-3}$ cm.$^3$/sec.; heat distortion temperature, 98.9° C.

The heat distortion temperatures were measured in accordance with ASTM D 648-56 under a load of 18.5 kg./cm.$^2$.

EXAMPLE 7

In order to obtain resins having a high heat resistance following three kinds of solution were prepared in advance.

Solution A

The same as the Solution A in Example 4.

Solution B

The same as the Solution B in Example 4.

Solution C

| | Parts |
|---|---|
| Vinyl toluene | 99 |
| LPO | 0.3 |
| AN | 31 |
| t-D$_0$SH | 0.8 |

The polymerization was carried out by the same method as in Example 4 except that vinyl toluene was used instead of ST. The polymerization proceeded as in the case when ST was used. The yield was 90 percent. Characteristic properties obtained were as follow: impact resistance, 25.4 kg.-cm./cm.; tensile strength, 420 kg./cm.$^2$; elongation, 44 percent; flowing out velocity, 3.4×10$^{-3}$ cm.$^3$/sec.; heat distortion temperature, 98° C.

EXAMPLE 8

Three kinds of solutions having following compositions were prepared in advance.

Solution A

| | Parts |
|---|---|
| Water | 200 |
| Ammonium persulfate | 0.05 |
| PVA (the same material as in Example 4) | 0.7 |

Solution B

The same as the Solution B of Example 4.

Solution C

| | Parts |
|---|---|
| ST | 99 |
| Benzoyl peroxide | 0.3 |
| AN | 31 |
| t-D$_0$SH | 0.2 |

The polymerization was carried out with use of benzoyl peroxide and ammonium persulfate as initiators. Though the impact resistance of resulting polymer was slightly low the flowing out velocity was increased. Characteristic properties are shown below: impact resistance, 219 kg.-cm./cm.; tensile strength, 310 kg./cm.$^2$; elongation, 29%; flowing out velocity, 12.3×10$^{-3}$ cm.$^3$/sec.

EXAMPLE 9

By changing the ratio of time required for the polymerization in the emulsion state and for that in the suspension state after break down of emulsion, the improvement on flowing out velocity was attempted. The solutions used in the polymerization charges were as follow:

Solution A

| | Parts |
|---|---|
| Water | 200 |
| PVA (the same material as in Example 4) | 2.0 |
| KPS | 0.05 |

Solution B

The same as the Solution B in Example 4.

Solution C

The same as the Solution C in Example 4.

At 40 minutes from the commencement of polymerization, since the viscosity of solution increased exceedingly, 200 cc. 0.5 percent PVA aqueous solution was added to the polymerization system. As a result, the flowing out velocity was improved. The yield was 92 percent. Characteristic properties of resulting polymers were as follow: impact resistance, 31.3 kg.-cm./cm.; tensile strength, 370 kg./cm.$^2$; elongation, 59.2 percent; flowing out velocity, 11.8×10$^{-3}$ cm.$^3$/sec.

EXAMPLE 10

The polymerization was carried out with use of an antioxidant introduced in the polymerization system during the polymerization time to prevent resins from being oxidized.

The compositions of Solutions A, B and C were the same as in Example 4. Soon after the commencement of polymerization, 0.5 part zinc laurylate was added to the polymerization system and the polymerization was carried out as in Example 4. The yield was 95 percent.

Characteristic properties of resulting polymers were as follows: impact resistance, 40.5 kg-cm./cm.; tensile strength, 402 kg./cm.$^2$; elongation, 21 percent; flowing out velocity, 4.2×10$^{-3}$ cm.$^3$/sec.

EXAMPLE 11

Three kinds of solutions having following compositions were prepared in advance.

Solution A

| | Parts |
|---|---|
| Water | 200 |
| PVA | 0.8 |
| STK (rosin acid soap, supplier Kao-Sekken K.K.) | 0.5 |

Solution B

| | Parts |
|---|---|
| Poly(vinyl chloride) latex (solid matter 35 percent) | 522 |
| SBR latex (Supplier Nippon Geon, trade name Nipol 4850, solid matter 59.5 percent) | 40 |

Solution C

| | Parts |
|---|---|
| AN | 27 |
| ST | 73 |
| t-D$_o$SH | 0.4 |
| LPO | 2.0 |

The Solution C was added to the Solution A and after emulsification, the Solution B was added thereto. At 2 hours after the commencement of polymerization, since the viscosity of the polymerization solution was increased exceedingly, 200 cc. of 0.5 percent aqueous solution of PVA was added to the polymerization system. Characteristic properties of resulting resins were as follows: impact strength (notched), 20.3 kg.-cm./cm. (at 23° C.); tensile strength, 431 kg.-cm./cm. (at 21° C.); bending strength, 770 kg./cm.$^2$ and Rockwell hardness, M–80.

What is claimed is:
1. A method for graft-copolymerizing a vinyl monomer selected from the group consisting of an aromatic vinyl compound and a compound having the general formula

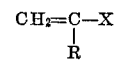

wherein R is a member selected from the group consisting of a hydrogen atom and a —CH$_3$ radical, and X is a member selected from the group consisting of a chlorine atom, and —CN and carboxyl ester radicals, and mixtures of said vinyl monomers, on a diene-type polymer in the form of a latex, said diene-type polymer being selected from the group consisting of polybutadiene and copolymers of butadiene with at least an aromatic vinyl monomer which comprises effecting the polymerization in the presence of a polymerization initiator soluble in the vinyl monomer and being selected from the group consisting of organic peroxides and azo compounds, a water-soluble polymerization initiator selected from the group consisting of persulfates, hydrogen peroxide and redox catalyst systems and a suspending agent in an amount sufficient to convert the reaction product from the emulsion state to the suspension state.

2. The method of claim 1, wherein said diene-type polymer is mixed with polyvinyl chloride in a latex mixture.

3. The method of claim 1, wherein water is added at the time when the emulsion is broken during the course of polymerization so as to disperse again the reaction product and continue the polymerization.

4. The method of claim 3, wherein the added water contains a suspending agent.

5. The method of claim 1, wherein said diene-type polymer is polybutadiene and said vinyl monomer is styrene.

6. The method of claim 1, wherein said diene-type polymer is a copolymer of butadiene and styrene.

7. The method of claim 6, wherein said copolymer contains at least 60% by weight of butadiene.

8. The method of claim 1, wherein said diene-type polymer is a copolymer of butadiene, styrene and acrylonitrile.

9. The method of claim 8, wherein said copolymer contains 5–30 parts by weight of butadiene, 50–85 parts by weight of styrene and 10–30 parts by weight of acrylonitrile.

References Cited

UNITED STATES PATENTS 2,741,650  4/1956  Lukman et al.
2,913,426  11/1959  Li et al.

SAMUEL H. BLECH, *Primary Examiner.*

W. J. BRIGGS, SR., *Assistant Examiner.*

U.S. Cl. X.R.

260—29.7, 876, 879